United States Patent [19]

Lindquist

[11] E Re. 30,019

[45] Reissued Jun. 5, 1979

[54] PRODUCTION OF HYDROCARBONS FROM UNDERGROUND FORMATIONS

[75] Inventor: Robert H. Lindquist, Berkeley, Calif.

[73] Assignee: Chevron Research Company, San Francisco, Calif.

[21] Appl. No.: 811,502

[22] Filed: Jun. 30, 1977 (Under 37 CFR 1.47)

Related U.S. Patent Documents

Reissue of:

[64] Patent No.: 3,892,270
Issued: Jul. 1, 1975
Appl. No.: 476,836
Filed: Jun. 6, 1974

[51] Int. Cl.[2] ..... E21B 43/24

[52] U.S. Cl. ..... 166/251; 166/252; 166/261; 166/270; 166/50

[58] Field of Search ..... 166/50, 251, 252, 259, 166/260, 261, 262, 270–272, 300

[56] References Cited

U.S. PATENT DOCUMENTS

| | | | |
|---|---|---|---|
| 2,695,163 | 11/1954 | Pearce et al. | 166/261 X |
| 3,032,102 | 5/1962 | Parker | 166/251 |
| 3,044,545 | 7/1962 | Tooke | 166/261 X |
| 3,048,225 | 8/1962 | Reichle | 166/260 X |
| 3,145,772 | 8/1964 | Huitt | 166/261 X |
| 3,171,479 | 3/1965 | Parrish et al. | 166/261 |
| 3,227,211 | 1/1966 | Gilchrist | 166/259 |
| 3,250,327 | 5/1966 | Crider | 166/262 X |
| 3,298,434 | 1/1967 | Graham | 166/261 X |
| 3,344,856 | 10/1967 | Lange | 166/261 X |
| 3,386,508 | 6/1968 | Bielstein et al. | 166/272 |
| 3,454,365 | 7/1969 | Lumpkin et al. | 166/251 UX |
| 3,628,929 | 12/1971 | Glass et al. | 166/256 X |

*Primary Examiner*—Stephen J. Novosad
*Attorney, Agent, or Firm*—R. L. Freeland, Jr.; G. W. Wasson

[57] ABSTRACT

A method for recovering hydrocarbons by injecting a mixture of oxidizing gas and steam into a lateral conduit in a hydrocarbon-containing formation to produce a product gas and, based on values contained in such gas, controlling the reactions between mixtures of oxidizing gas and steam and hydrocarbons in the formation to optimize the Btu value of the product gas.

16 Claims, 2 Drawing Figures

| PERCENTAGE OF $C_1 + C_2$ TO TOTAL GAS VOLUMN | CO/$CO_2$ RATIO LESS THAN 1 | CO/$CO_2$ RATIO 1 TO 2 | CO/$CO_2$ RATIO GREATER THAN 2 |
|---|---|---|---|
| + 30 % OF PRODUCT | SPACE RATE TOO HIGH- DECREASE INLET PRESSURE | DECREASE INLET PRESSURE- INCREASE $O_2/H_2O$ RATIO | HAZARD THAT OUTLET TEMPERATURE WILL RISE RAPIDLY-REACTION TOO CLOSE TO PRODUCER- INCREASE BACK PRESSURE- DECREASE INLET PRESSURE- INCREASE $O_2/H_2O$ RATIO |
| 10-30% PRODUCTION VOL. % OF PRODUCT | DECREASE $O_2/H_2O$ RATIO- MAINTAIN DIFFERENTIAL PRESSURE | OPTIMUM CONDITION MAXIMUM $C_{12}^-$ TO $C_3^+$ WITH HIGH BTU VALUE (+250/SCF) OF $C_2^- + CO + H_2$ COMBUSTION ZONE UNDER CONTROL | INCREASE INLET PRESSURE- INCREASE $O_2/H_2O$ RATIO |
| 0-10 % OF PRODUCT | TOO MUCH OXYGEN-DECREASE $O_2/H_2O$ RATIO-INCREASE DIFFERENTIAL PRESSURE- WATCH FOR $O_2$ BREAK THROUGH | TOO LONG RESIDENCE TIME- INCREASE SPACE RATE BY HIGHER INLET-LOWER OUTLET PRESSURE | INSUFFICIENT CRACKING- INCREASE PRESSURE AT INLET AND OUTLET TO FORCE REACTION ZONE FURTHER AWAY FROM LATERAL CONDUIT |

FIG. 2

PRODUCTION OF HYDROCARBONS FROM UNDERGROUND FORMATIONS

Matter enclosed in heavy brackets [ ] appears in the original patent but forms no part of this reissue specification; matter printed in italics indicates the additions made by reissue.

BACKGROUND OF THE INVENTION

The invention relates to recovering a gaseous product gas containing hydrocarbon values from a hydrocarbon-containing formation, and more particularly the present invention relates to injecting a mixture of oxidizing gas and steam into a lateral conduit in a partially depleted petroleum-containing formation to produce a combustible product gas, analyzing the produced product gas for values of selected gaseous components and, based on such values, controlling the reactions between the mixture of oxidizing gas and steam and the petroleum in the formation to optimize production of product gas in the formation, and recovering the product gas through a recovery well.

A major problem has been the economic recovery of hydrocarbons from reservoirs that cannot be produced economically by conventional techniques. This problem is particularly acute when it is desired to recover hydrocarbons from partially depleted heavy-oil reservoirs. Although the term "heavy oil" is only relative nomenclature and may be defined differently in different localities, it usually refers to oils with a gravity of less than 20° API.

Heretofore, many processes have been utilized in attempting to recover hydrocarbon values from such reservoirs. The application of heat to the oil by steam injection or underground combustion has been done to assist recovery. Various underground gasification processes have been suggested, particularly for use in tar sands as taught in U.S. Pat. No. 3,250,327. There is still a need, however, for a process which will economically maximize recovery of hydrocarbon values from partially depleted heavy-oil reservoirs.

BRIEF DESCRIPTION OF THE INVENTION

The present invention is directed to a method for converting petroleum within an underground formation into combustible product gas and bringing the so-formed product gas to the Earth's surface for subsequent distribution. An input well and a producing well are connected by a lateral connecting hole, which at least in part penetrates the petroleum-containing underground formation. The lateral connecting hole is packed with a permeable material so that the connecting hole has a permeability in excess that of the underground formation.

A mixture of oxidizing gas and steam is injected down the input well into the lateral connecting hole to react with petroleum in the formation by partial oxidation and by thermal cracking to form a product gas containing sufficient fractions of at least one of the following components, carbon monoxide, hydrogen and methane, to be combustible. The product gas is produced from the formation through the producing well. The produced product gas is analyzed for values of $C_1$ and $C_2$ hydrocarbons, carbon monoxide, carbon dioxide and oxygen. Based on a comparison of the values, the reactions in the formation between the mixture of oxidizing gas and steam and the petroleum are controlled to optimize the combustible fraction of the product gas.

OBJECT OF THE INVENTION

A principal object of the present invention is to maximize recovery of hydrocarbon values in gaseous form from a hydrocarbon-containing formation by controlling reactions in the formation based on values of the recovered gas.

BRIEF DESCRIPTION OF THE DRAWINGS

FIG. 2 is a diagram illustrating the control steps that are taken in response to the values of the gaseous components of the recovered product gas.

DETAILED DESCRIPTION OF THE PREFERRED EMBODIMENT

Figure 1:
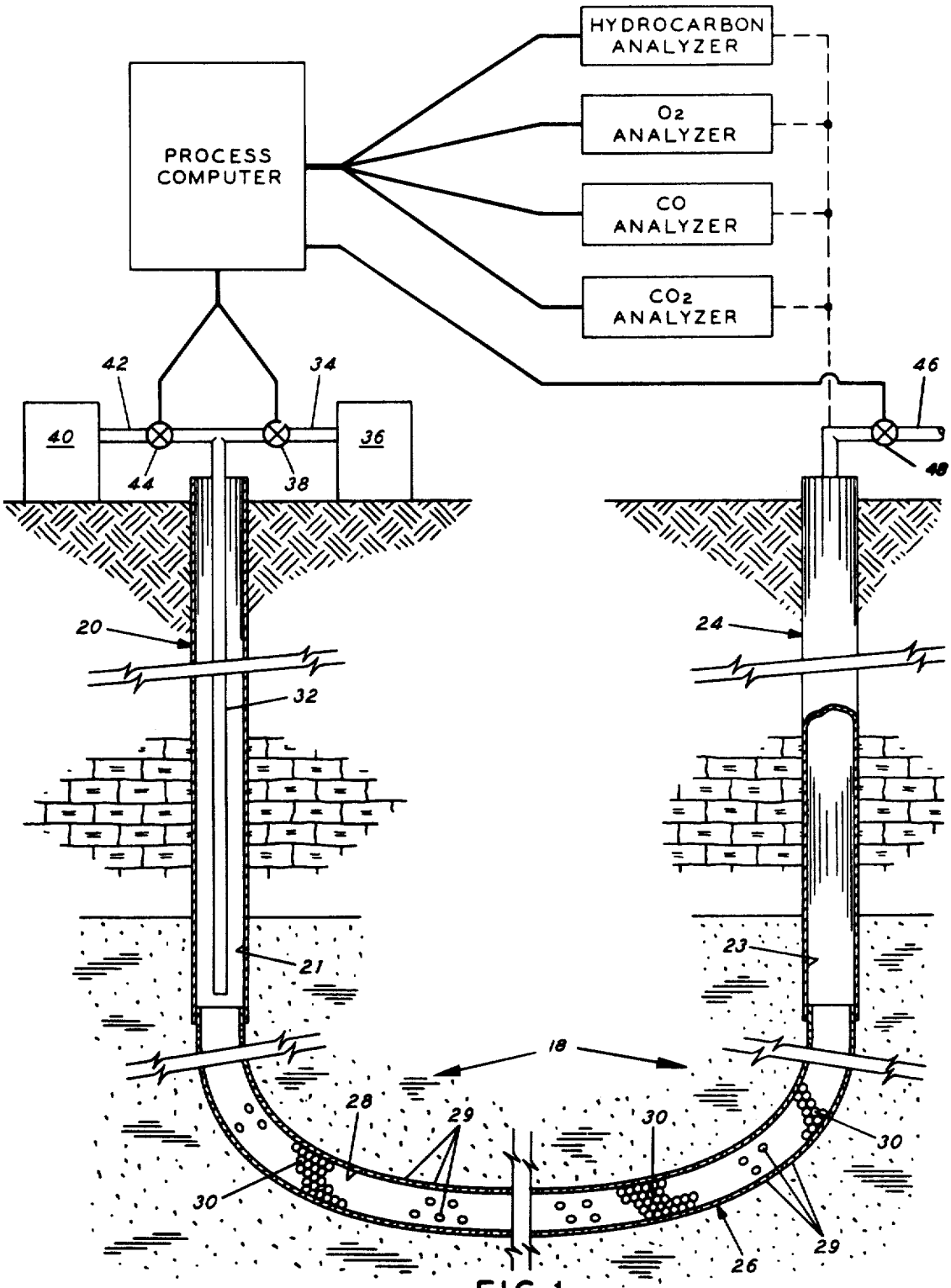
FIG. 1 is an elevation view, partially in section, and shows the preferred form of apparatus assembled in accordance with the present invention.

In accordance with the present invention and with relation to FIG. 1, a well 20 is connected to an output (producing) well 24 by means of a lateral connecting hole 26. At least the major portion of lateral connecting hole 26 starting from input well 20 is provided with a tube 28 having slots 29 which provide communication between the interior of the tube and the producing formation 18. The interior of tube 28 is packed with a material 30, such as alumina balls, sand or rock. The packing material 30 assists in supporting the tube 28 to prevent collapse and is placed in the tube in a manner to provide for permeability through the tube to be greatly in excess of the permeability of the producing formation 18. The permeability of tube 28 should be greater than the permeability of producing formation 18, and preferably the permeability of the tube should be at least 10 times as great as the permeability of formation 18.

Both input well 20 and output well 24 are cased with strings of casing 21 and 23, respectively. The lateral tube 28 is connected into the lower end of the casing string 21 and provides the only access to the producing formation 18 from well 20. The lateral tube 28 may be connected to the casing string 23 of output well 24. However, the lateral tube 28 is usually terminated in the vicinity of the output well 24 and a connecting hole is hydraulically jetted between the lower end of output well 24 and the end of lateral tube 28.

Input well 20 is arranged with wellhead equipment suitable for injecting fluids into the casing string and thence into lateral tube 28. Thus, injection tubing string 32 is joined to a steam conduit 34 extending from steam source 36. Control valve 38 controls flow of steam through conduit 34. A source of oxidizing gas 40, preferably oxygen, is also connected to the injection tubing 32 by a conduit 42. A valve 44 is used to control flow of oxygen to the input well. The output well 24 is completed to produce the gaseous products formed in accordance with the invention. A production tubing 46 is used to remove gas from the well. A suitable valve 48 is used to control such gas flow and thus the back pressure on the producing formation.

A small portion of the product gas is removed from the production tube 46 and is analyzed for values of certain produced gases. Based on a comparison of these values, the reaction in the lateral tube is controlled to provide for optimization of the combustible fraction of the product gas. A process computer is connected to receive input from the gas analysis. The computer is programmed to regulate certain of the process variables in response to values of the product gas. Thus the computer is adapted to control back pressure and gas flow from the output well 24 and to control inflow of steam and oxygen at the input well 20.

In accordance with the invention, a mixture of oxygen and steam is injected down an input well and is flowed into the formation through a lateral tube to produce product gas. Thus hydrocarbons can be recovered from heavy-oil fields by partial oxidation and thermal cracking of the hydrocarbons in situ. This cracking produces a product gas which includes carbon monoxide, hydrogen, methane, carbon dioxide and $C_1$ *to* $C_{10}$-hydrocarbons. The fuel value of the gas usually varies from 70 to 500 Btu/SCF, depending on the conditions of the reactions. In accordance with the invention, the operation is controlled to provide for maximizing the Btu value of the product gas.

To start operations in accordance with the invention a mixture of oxygen and superheated steam is injected into a formation. The oxygen and steam mixture should contain by volume between 1 to 3 parts oxygen and 1 to 9 parts steam. Usually it is initially preferred to inject a mixture containing about 1 part oxygen to 6 parts superheated steam. The initial injection pressure should be from 1.1 to 2 times the formation pressure. Formation pressures may vary between 50 to 10,000 psi. The present invention would find its greatest utility in formations having pressures from 700 psi to 2000 psi. The injection rate is controlled to produce desirable reactions in the formation. The injection rate is conveniently calculated by determining the void volume of the lateral tube and indicating the number of volume displacements per minute desired. Five void volume replacements per minute to 12 void volume replacements per minute are useful in the process. Generally an initial injection rate of 8 to 9 void volumes per minute is preferred.

The production well is initially held at a back pressure to promote a desirable reaction in the formation. The back pressure on the producing well is normally maintained in the range 0.5 to 0.9 of the formation pressure. Initially, a high back pressure in the range of about 0.9 times the formation pressure is held on the producing well. A product gas containing hydrocarbon values is produced in the lateral tube in the formation from depleted heavy oil by partial oxidation and thermal cracking of hydrocarbons in situ. The product gas is composed of various constituents including carbon monoxide, hydrogen, methane and $C_1$ to $C_{10}$ hydrocarbons, as well as carbon dioxide. The fuel value of the product gas may vary from 70 to 500 Btu/SCF, depending upon the conditions of the reaction.

It is desirable to maximize the Btu value of the product gas. This is done by optimizing production of methane relative to carbon monoxide and hydrogen. In maximizing production of methane, the reactions are favored by lower temperatures and higher space rates (short residence time of the product gas in the high-temperature zone). The methanation reactions are exothermic and hence desirable for local heat supply. Further, methane production inhibits carbon monoxide oxidation. The permeability of the lateral tube is an important factor in providing for high methane production. The permeability of the tube is controlled by the packing. The packing serves three functions: it is a stable, high-temperature material that prevents collapse of the lateral tube in case of localized hot spots; the presence of the packing prevents a hazardous detonation from propagating as through an open tube; the packing may serve as a catalyst support surface.

The product gas constituents may be optimized by controlling the ratio of oxidizing gas to steam. The ratio of oxidizing gas to steam controls the peak temperature and influences the relative rate of the water/gas-shift reaction. The ratio of these gases is controlled continuously during the process by monitoring the composition of the produced product gas. The temperatures surrounding the combustion zone may also be monitored. If the oxidizing gas is oxygen, typical volume percent of oxygen in steam range from 75 percent to 10%, with the preferred range from 30–50 percent oxygen.

The partial pressure of gas in the connecting lateral tube also affects the composition of the product gas. During the course of the process over many months, the pressure in the formation will change relative to the initial pressure, and the desired pressure differential between the formation and the lateral tube will shift. Monitoring the product gas for optimum Btu value will cause changes to be made in the injection pressure and the back-pressure regulator at the product gas output well so that maximum utilization of the heat of reaction in producing the largest quantity of high-Btu gas is achieved. It may be desired to cycle the pressure in the lateral tube over time spans from several days down to several minutes. The cyclic effect may be desired where sand plugging problems arise or where coke laydown in the surrounding formation should be moved to a new site as the method progresses.

Catalysts or catalyst precursors are sometimes useful in the process. Vapor-phase catalysts or catalyst materials, such as metal carbonyls, organic halides and the like, may be used to control particular reactions in the lateral oxidation tube. As described in U.S. Pat. No. 2,804,146, organic chlorides are effectively used in retarding the oxidation of carbon monoxide to carbon dioxide. Injection of the catalyst materials may be done in a pulsed fashion, so that if the catalysts deactivate in the lateral tube over a period of time another pulse renews the active service, or they may be supplied continuously at low concentrations to maintain catalyst activity.

FIG. 2 is a chart illustrating the control steps, which are taken in response to the values of the gaseous components of the product gas recovered from the output well to maximize the Btu value of the product gas being formed in the lateral tube. The ratio of carbon monoxide to carbon dioxide and the volume percentage of $C_1$ and $C_2$ hydrocarbons to the total product gas are important. A carbon monoxide/carbon dioxide ratio of from 1 to 2 and a volume percentage of $C_1$ and $C_2$ hydrocarbons to total product gas of from 10 percent to 30 percent indicate that the reaction in the lateral tube is optimized and that a product gas having high Btu value is being produced. When the gas values are in these ranges, no control steps are taken.

If the gas values are such that an optimum reaction is not taking place in the lateral tube, certain control measures are taken to promote an optimum reaction. Thus, if the volume percentage of $C_1$ and $C_2$ hydrocarbons to total product gas remains at a desirable level, i.e., 10 percent to 30 percent, and the ratio of carbon monoxide to carbon dioxide falls to less than 1, the ratio of oxygen to steam is decreased while the differential pressure in the lateral tube is maintained. If the ratio of carbon monoxide to carbon dioxide goes above 2, which is an unlikely occurrence except at start-up or upset, then the inlet pressure is increased and the oxygen-to-steam ratio is increased. The product gas is continuously analyzed to determine what effect these control steps have on the reaction occurring in the tube to see if the reaction is being optimized.

If, on the other hand, the carbon monoxide-to-carbon dioxide ratio remains at a value of from 1 to 2 and the volume percent of $C_1$ plus $C_2$ hydrocarbons to total product gas varies to above 30 percent, the inlet pressure of the oxygen-steam mixture is reduced and the oxygen-to-steam ratio is increased. If the $C_1$ plus $C_2$ percentage falls below 10 percent, the residence time of the gas is too long. Therefore, the space rate of the mixture is increased by raising the input pressure and reducing the output pressure.

If both the carbon monoxide-to-carbon dioxide ratio and the volume percent of $C_1$ plus $C_2$ to total product gas vary from optimum conditions, certain control steps are taken in accordance with the invention to produce an optimum reaction in the lateral tube. FIG. 2 is used to determine what control steps are required, depending on the values of the product gas. The control measures of FIG. 2 have been demonstrated over a formation pressure range of from 700 to 2000 psi. They are believed to be substantially controlling over the entire range of formation pressures of the invention.

A demonstration was conducted to illustrate the advantage of the present invention at very low pressure, on the order of 15 psi. The process was conducted in a 6-foot diameter reactor sphere insulated and externally heated to represent an isothermal zone of a California oil field. The reactor was loaded with 10,300 pounds of mixed foundary sand that simulated the characteristics of oil sand. The permeability of the sand after water saturation and crude saturation at 145° F. varied between 900–1000 millidarcies. The characteristics of the California crude used are shown in the following table.

TABLE 1

| | | Special Analysis of a California Crude Oil | | | | | | | | |
|---|---|---|---|---|---|---|---|---|---|---|
| | | DISTILLATES | | | | | | RESIDUA | | Whole Dry |
| Vapor Line Cut Point | | at | 300- | 400- | 500- | 650- | (700) | | | |
| Temperatures, ° F. | | 300 | 400 | 500 | 650 | (700) | 1000 | 1000+ | 650+ | Crude |
| Yield, vol. % from crude | | 1.2 | 3.6 | 7.4 | 13.4 | 5.1 | 25.6 | 43.7 | 74.4 | 100.0 |
| Yield at start of cut | | 0.0 | 1.2 | 4.8 | 12.2 | 25.6 | 30.7 | 56.3 | 25.6 | 0.0 |
| Yield at end of cut | | 1.2 | 4.8 | 12.2 | 25.6 | 30.7 | 56.3 | 100.0 | 100.0 | 100.0 |
| Gravity, ° API | | 50.5 | 41.3 | 34.0 | 26.2 | 23.0 | 16.9 | 3.6 | 9.0 | 14.4 |
| Sulfur, wt.% | | | | | | | | | | 0.92 |
| Paraffins | | 21.5 | 18.0 | 8.8 | | | | | | |
| Naphthebes | | 74.0 | 40.6 | 23.2 | | | | | | |
| Dinaphthenes | | | 29.3 | 34.7 | | | | | | |
| Trinaphthenes | | | | 9.3 | | | | | | |
| Subtotal Naphthenes | | 74.0 | 69.9 | 67.2 | | | | | | |
| Alkylbenzenes | | 4.5 | 8.7 | 4.8 | | | | | | |
| Indanes, tetralins | | | 3.3 | 12.3 | | | | | | |
| Benzodinaphthenes | | | | 1.8 | | | | | | |
| Naphthalenes | | | | 4.6 | | | | | | |
| Benzoindanes, benzotetralins | | | | 0.5 | | | | | | |
| Subtotal aromatics | | 4.5 | 12.0 | 24.0 | | | | | | |
| Viscosity, Csts | at 100° F. | | | | | | | | | 1036 |
| | at 130° F. | | | | | | | | | 272 |
| | at 210° F. | | | | | | | 3790 | 640 | |
| | at 275° F. | | | | | | | 330 | 99.2 | |
| Mid boiling point by Sun. TBP Dist. | | | 370 | 471 | 594 | 744 | 843 | | | |
| Ramsbottom carbon, wt. % | | | | | | | | 22.3 | | |

A simulated slotted tube extended as a diameter midway through the reactor. Eight rows of slots 0.01 inch wide by 1 inch long were cut on 1½ inch centers in the middle 4 feet of ⅝ inch-OD by 0.035 inch-wall Type 316 stainless steel tube. Centered in this tube was a ¼ inch-diameter incoloy-sheathed tubular heating element with 1320 watts rated capacity. The annulus between this heating element and the tube was filled with ⅛ inch-diameter alundum balls. Small blocks of Boise sandstone 2 inches square by 7 inches long with ⅝ inch holes through their centers were slipped over the slotted portions of the tubes. These sandstone blocks served to prevent sand plugging on the slotted liner tube.

The analytical train consisted of an oxygen analyzer, a carbon monoxide analyzer and a carbon dioxide analyzer. The mass flow of gas to the reactor was monitored with a mass flowmeter. Twenty-four thermocouple points were displayed sequentially on a recorder. Periodic samples were taken of the gas and liquid products for later analysis. During start-up, approximately 800 watts of heat was applied to the sheathed heater while adding oxygen and steam at 15 psig mass flow rate of 10 liters/minute. Within 1 hour the temperature 1 foot downstream from the opening of the first slot in the lateral tube reached 600° F., and the carbon monoxide was noted in the product gas. Within 3 hours temperatures reached 1500° F. and the heater was shut off. The run was continued for 72 hours. A typical gas composition consisted of 7 percent methane, 1.7 percent ethane, 12 percent carbon monoxide, 2 percent hydrogen, with the balance carbon dioxide. Condensate sample yield analysis is shown in Table II.

TABLE II

| | Detailed Coposition Summary (Volume Percent) | | | | | | | | |
|---|---|---|---|---|---|---|---|---|---|
| Carbon No. | Normal Paraffin | Iso-paraffin | Naph-thenes | Olefins | Aro-matics | Unclassi-fied | Totals | Cyclo-Pentanes | Cyclo-Hexanes |
| 3 | 0.07 | 0.00 | 0.00 | 0.03 | 0.00 | 0.00 | 0.10 | 0.00 | 0.00 |
| 4 | 0.14 | 0.03 | 0.00 | 0.16 | 0.00 | 0.00 | 0.33 | 0.00 | 0.00 |

TABLE II-continued

| Carbon No. | Normal Paraffin | Iso-paraffin | Naph-thenes | Olefins | Aro-matics | Unclassi-fied | Totals | Cyclo-Pentanes | Cyclo-Hexanes |
|---|---|---|---|---|---|---|---|---|---|
| | Detailed Coposition Summary (Volume Percent) | | | | | | | | |
| 5 | 0.34 | 0.23 | 0.08 | 0.68 | 0.00 | 0.00 | 1.33 | 0.08 | 0.00 |
| 6 | 0.52 | 0.83 | 1.16 | 0.73 | 0.25 | 0.00 | 3.50 | 0.75 | 0.41 |
| 7 | 0.46 | 1.72 | 3.25 | 1.12 | 0.00 | 0.00 | 6.56 | 3.25 | 0.00 |
| 8 | 0.00 | 0.00 | 0.00 | 0.05 | 0.00 | 22.71 | 22.77 | 0.00 | 0.00 |
| 9 | 0.00 | 0.00 | 0.00 | 0.00 | 0.00 | 27.73 | 27.73 | 0.00 | 0.00 |
| 10 | 0.00 | 0.00 | 0.00 | 0.00 | 0.00 | 17.25 | 17.25 | 0.00 | 0.00 |
| 11 | 0.00 | 0.00 | 0.00 | 0.00 | 0.00 | 13.73 | 13.73 | 0.00 | 0.00 |
| 12 | 0.00 | 0.00 | 0.00 | 0.00 | 0.00 | 6.72 | 6.72 | 0.00 | 0.00 |
| Total | 1.53 | 2.81 | 4.49 | 2.78 | 0.25 | 88.14 | 100.00 | 4.08 | 0.41 |
| Calculated Properties | | | RVP | | | 1.84 | | | |
| | | | Gravity, °API | | | 56.5 | | | |
| | | | Specific Gravity | | | 0.7525 | | | |
| | | | Carbon/Hydrogen Ratio | | | 5.93 | | | |
| | | | No. of Compounds | | | 58 | | | |
| | | | Average Molecular Weight | | | 124.4 | | | |

SUMMARY OF THE INVENTION

The present invention provides a method for converting petroleum within an underground formation into combustible product gas and bringing the so-formed product gas to the surface. An input well and a producing well are connected by a lateral connecting hole, which at least in part penetrates the petroleum-containing underground formation. A tube is positioned in the lateral connecting hole and the tube is packed with a permeable material so that the tube has a permeability in excess of that of the underground formation.

A mixture of oxidizing gas and steam is injected down the input well into the lateral connecting tube to react with petroleum in the formation by partial oxidation and by thermal cracking to form a product gas containing sufficient fractions of at least one of the components carbon monoxide, hydrogen and methane to be combustible. The product gas is produced from the formation through the producing well. The produced product gas is analyzed for values of $C_1$ and $C_2$ hydrocarbons, carbon monoxide, carbon dioxide and oxygen. Based on a comparison of the values, the reactions in the formation between the mixture of oxidizing gas and steam and the petroleum are controlled to optimize the combustible fraction of the product gas.

Although certain preferred embodiments of the invention have been described in detail, the invention is not meant to be limited to only these embodiments but rather by the scope of the appended claims.

What is claimed is:

1. A method for converting petroleum within an underground formation into combustible product gas and bringing the so-formed product gas to the Earth's surface for subsequent distribution comprising connecting at least one input well with at least one producing well by a lateral connecting hole which at least in part penetrates an underground formation containing petroleum; packing said connecting hole with a permeable material so that said connecting hole has a permeability in excess of the permeability of said underground formation; injecting oxidizing gas and steam down said input well into said lateral connecting hole to react with petroleum in said formation by partial oxidation and by thermal cracking to form a product gas containing sufficient fractions of at least one of the components carbon monoxide, hydrogen and methane to be combustible, producing said product gas from said formation through said producing well; analyzing said product gas for values of $C_1$ and $C_2$ hydrocarbons, carbon monoxide and carbon dioxide; and controlling the reactions within said connecting hole based on said values to optimize the Btu value of said product gas.

2. The method of claim 1 further characterized by controlling said reactions to provide a carbon monoxide-to-carbon dioxide ratio of from 1 to 2 and a $C_1$ plus $C_2$ hydrocarbon volume percentage of 10 percent to 30 percent of the total product gas.

3. The method of claim 2 further characterized in that the permeability of said connecting hole is at least ten times the permeability of said formation.

4. The method of claim 3 further characterized by adding a catalyst to the lateral connecting hole to assist in controlling the reactions.

5. The method of claim 3 further characterized in that a slotted tube is inserted into said lateral connecting hole.

6. A method of converting petroleum within an underground formation into combustible product gas and bringing the so-formed product gas to the earth's surface for subsequent distribution comprising connecting at least one input well with at least one producing well by a lateral connecting hole which at least in part penetrates an underground formation containing petroleum; inserting a slotted tube into said lateral connecting hole; packing said tube with a permeable material so that said tube has a permeability at least 10 times the permeability of said underground formation; injecting oxidizing gas and steam down said input well into said tube to react with petroleum in said formation by partial oxidation and by thermal cracking to form a product gas containing sufficient fractions of at least one of the components carbon monoxide, hydrogen and methane to be combustible; producing said product gas from said formation through said producing well; analyzing said product gas for values of $C_1$ and $C_2$ hydrocarbons, carbon monoxide and carbon dioxide; and controlling the reactions within said tube to maintain a carbon monoxide-to-carbon dioxide ratio in the range from 1 to 2 and a $C_1$ plus $C_2$ hydrocarbon volume percentage in the range from 10 percent to 30 percent of the total product gas.

7. The method of claim 6 further characterized in that the initial injection mixture of oxidizing gas and steam is maintained at between 1 to 3 parts oxygen and 1 to 9 parts steam and the pressure of oxidizing gas and steam injected into said tube is between 1.1 to 2 times the pressure in said formation and that back pressure between 0.5 to 0.9 times the formation pressure is held on said producing well.

8. The method of claim 7 further characterized in that the initial injection rate of said oxidizing gas and steam is maintained at a value between 8 to 9 void volumes per minute.

*9. A method for converting hydrocarbons within an underground formation into combustible product gas and bringing the so-formed product gas to the earth's surface for subsequent distribution comprising connecting at least one input well with at least one producing well by a lateral connecting hole which at least in part penetrates an underground formation containing hydrocarbons, packing said connecting hole with a permeable material so that said connecting hole has a permeability in excess of the permeability of said underground formation; injecting oxidizing gas and steam down said input well into said lateral connecting hole to react with hydrocarbons in said formation by partial oxidation and by thermal cracking to form a product gas containing sufficient fractions of at least one of the components carbon monoxide, hydrogen and methane to be combustible, producing said product gas from said formation through said producing well; analyzing said product gas for values of $C_1$ and $C_2$ hydrocarbons, carbon monoxide and carbon dioxide; and controlling the reactions within said connecting hole based on said values to optimize the Btu value of said product gas.*

*10. The method of claim 9 further characterized by controlling said reactions to provide a carbon monoxide-to-carbon dioxide ratio of from 1 to 2 and a $C_1$ plus $C_2$ hydrocarbon volume percentage of 10 percent to 30 percent of the total product gas.*

*11. The method of claim 10 further characterized in that the permeability of said connecting hole is at least ten times the permeability of said formation.*

*12. The method of claim 11 further characterized by adding a catalyst to the lateral connecting hole to assist in controlling the reactions.*

*13. The method of claim 11 further characterized in that a slotted tube is inserted into said lateral connecting hole.*

*14. A method of converting hydrocarbons within an underground formation into combustible product gas and bringing the so-formed product gas to the earth's surface for subsequent distribution comprising connecting at least one input well with at least one producing well by a lateral connecting hole which at least in part penetrates an underground formation containing hydrocarbons; inserting a slotted tube into said lateral connecting hole; packing said tube with a permeable material so that said tube has a permeability at least 10 times the permeability of said underground formation; injecting oxidizing gas and steam down said input well into said tube to react with hydrocarbons in said formation by partial oxidation and by thermal cracking to form a product gas containing sufficient fractions of at least one of the components carbon monoxide, hydrogen and methane to be combustible; producing said product gas from said formation through said producing well; analyzing said product gas for values of $C_1$ and $C_2$ hydrocarbons, carbon monoxide and carbon dioxide; and controlling the reactions within said tube to maintain a carbon monoxide-to-carbon dioxide ratio in the range from 1 to 2 and a $C_1$ plus $C_2$ hydrocarbon volume percentage in the range from 10 percent to 30 percent of the total product gas.*

*15. The method of claim 14 further characterized in that the initial injection mixture of oxidizing gas and steam is maintained at between 1 to 3 parts oxygen and 1 to 9 parts steam and the pressure of oxidizing gas and steam injected into said tube is between 1.1 to 2 times the pressure in said formation and that back pressure between 0.5 to 0.9 times the formation pressure is held on said producing well.*

*16. The method of claim 15 further characterized in that the initial injection rate of said oxidizing gas and steam is maintained at a value between 8 to 9 void volumes per minute.*

* * * * *